US012413893B2

(12) United States Patent
Jang

(10) Patent No.: US 12,413,893 B2
(45) Date of Patent: Sep. 9, 2025

(54) DEFORMABLE EAR TIPS AND WEARABLE DEVICE INCLUDING SAME

(71) Applicant: Samsung Electronics Co., Ltd., Suwon-si (KR)

(72) Inventor: Youngsang Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 18/362,115

(22) Filed: Jul. 31, 2023

(65) Prior Publication Data

US 2024/0107220 A1 Mar. 28, 2024

Related U.S. Application Data

(63) Continuation of application No. PCT/KR2023/010781, filed on Jul. 25, 2023.

(30) Foreign Application Priority Data

Sep. 23, 2022 (KR) ........................ 10-2022-0120932
Oct. 17, 2022 (KR) ........................ 10-2022-0133600

(51) Int. Cl.
*H04R 1/10* (2006.01)

(52) U.S. Cl.
CPC ......... *H04R 1/1066* (2013.01); *H04R 1/1016* (2013.01)

(58) Field of Classification Search
CPC .. H04R 1/1016; H04R 25/652; H04R 25/656; H04R 2225/025; H04R 2225/77
See application file for complete search history.

(56) References Cited

U.S. PATENT DOCUMENTS

| | | | | |
|---|---|---|---|---|
| 8,189,845 | B2 | 5/2012 | Mulvey | |
| 8,348,011 | B1 * | 1/2013 | Huang | H04R 25/656 381/328 |
| 8,462,973 | B2 | 6/2013 | Gibbons | |
| 10,123,137 | B2 | 11/2018 | Chang et al. | |
| 11,012,770 | B2 | 5/2021 | Hatfield et al. | |

(Continued)

FOREIGN PATENT DOCUMENTS

| | | | | |
|---|---|---|---|---|
| CN | 113596666 A * | 11/2021 | | |
| DE | 102012204287 A1 * | 1/2013 | | H04R 25/656 |

(Continued)

OTHER PUBLICATIONS

Search Report and Written Opinion dated Nov. 14, 2023 issued in International Patent Application No. PCT/KR2023/010781.

*Primary Examiner* — Ryan Robinson
(74) *Attorney, Agent, or Firm* — Nixon & Vanderhye, P.C.

(57) ABSTRACT

According to an embodiment, a wearable device includes: a housing, an audio port protruding from the housing in a first direction and configured to transmit an audio signal from an audio output circuit disposed in the housing, and an ear tip including a fastening part inserted in a pit disposed in an end portion of the audio port, an extension part extending from the fastening part in the first direction, a radiation surface including openings spaced apart from the extension part, a wing extending from a periphery of the radiation surface to the audio port. The extension part includes a first material, and the fastening part includes a second material having lower flexibility than a flexibility of the first material.

20 Claims, 12 Drawing Sheets

(56) References Cited

U.S. PATENT DOCUMENTS

| | | | | |
|---|---|---|---|---|
| 11,381,897 | B2 * | 7/2022 | Ko | H04R 1/1058 |
| 11,689,840 | B2 | 6/2023 | Kim et al. | |
| 11,962,963 | B2 * | 4/2024 | Matsumura | H04R 1/1041 |
| 2010/0166241 | A1 | 7/2010 | Sabio | |
| 2014/0355809 | A1 | 12/2014 | Killion et al. | |
| 2020/0107101 | A1 | 4/2020 | Grinker et al. | |
| 2020/0329321 | A1 * | 10/2020 | de Ruijter | H04R 25/48 |
| 2022/0038806 | A1 * | 2/2022 | Cheng | H04R 1/1016 |
| 2022/0070572 | A1 | 3/2022 | Ko et al. | |
| 2024/0205573 | A1 * | 6/2024 | Wang | H04R 1/1016 |
| 2025/0097652 | A1 * | 3/2025 | Petersen | H04R 25/656 |

FOREIGN PATENT DOCUMENTS

| | | | | |
|---|---|---|---|---|
| EP | 3232685 | | 3/2021 | |
| JP | 5031714 | B2 | 7/2012 | |
| JP | 2014-146949 | | 8/2014 | |
| JP | 2014146949 | A | 8/2014 | |
| JP | 2017-147677 | | 8/2017 | |
| JP | 7070997 | | 5/2022 | |
| KR | 10-2013-0111949 | | 10/2013 | |
| KR | 10-2021-0151577 | | 12/2021 | |
| KR | 10-2430360 | | 8/2022 | |
| KR | 10-2451114 | | 10/2022 | |
| KR | 10-2696907 | | 8/2024 | |
| WO | WO-2016188642 | A1 * | 12/2016 | H04R 1/1016 |
| WO | 2019173809 | A1 | 9/2019 | |

* cited by examiner

DEFORMABLE EAR TIPS AND WEARABLE DEVICE INCLUDING SAME

CROSS-REFERENCE TO RELATED APPLICATIONS

This application is a continuation of International Application No. PCT/KR2023/010781 designating the United States, filed on Jul. 25, 2023, in the Korean Intellectual Property Receiving Office and claiming priority to Korean Patent Application Nos. 10-2022-0120932, filed on Sep. 23, 2022, and 10-2022-0133600, filed on Oct. 17, 2022, in the Korean Intellectual Property Office, the disclosures of all of which are incorporated by reference herein in their entireties.

BACKGROUND

Field

The disclosure relates to a deformable ear tip and a wearable device including the same.

Description of Related Art

A wearable device may be worn on a portion of the user's body. The wearable device may receive data from an external electronic device and transmit the data to the user. The wearable device may be configured to transmit visual or auditory information to the user, based on information received from the external electronic device communicating with the wearable device.

SUMMARY

According to an example embodiment, a wearable device may comprise: a housing, an audio output circuit disposed in the housing, an audio port protruding from the housing in a first direction and configured to transmit an audio signal from the audio output circuit and including a pit disposed on an end portion, and an ear tip including a fastening part inserted in the pit, an extension part extending from the fastening part in the first direction, a radiation surface including openings configured to transmit the audio signal to an ear canal of a user wearing the wearable device and spaced apart from the extension part, and a wing extending from a periphery of the radiation surface to the audio port, wherein the extension part may be configured to change an angle between the first direction and the extension part and include a first material, and wherein the fastening part may include a second material having a lower flexibility than a flexibility of the first material.

According to an example embodiment, an ear tip may comprise: a fastening part including a groove configured to be coupled to an audio port of an electronic device, an extension part extending from the fastening part in a first direction, a radiation surface including openings spaced apart from the extension part and configured to transmit an audio signal to the ear canal of a user wearing the ear tip, and a wing extending from a periphery of the radiation surface toward the audio port. The extension part may be configured to change an angle between the first direction and the extension part and includes a first material. The fastening part may include a second material having a lower flexibility than a flexibility of the first material.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
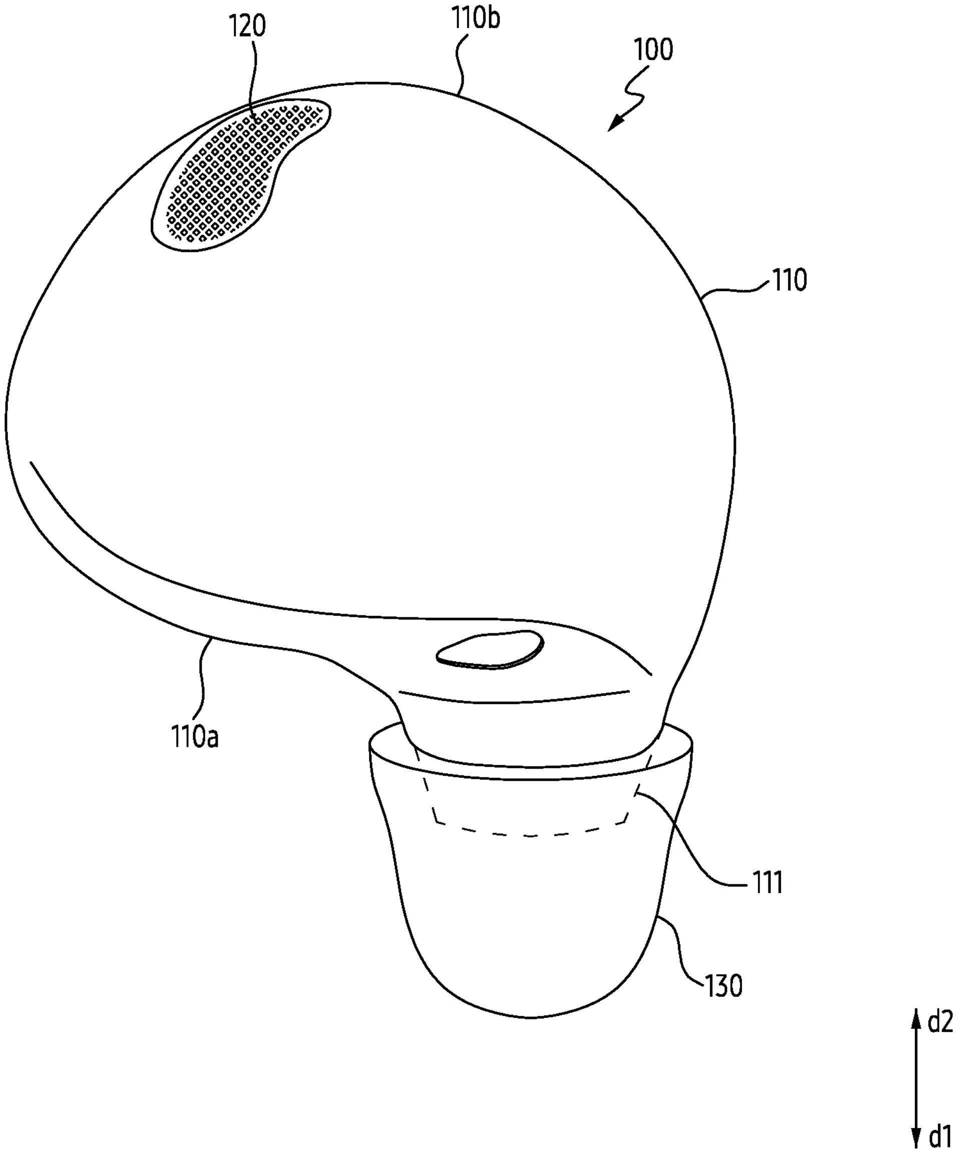
FIG. 1 is a perspective view of an example wearable device according to various embodiments.

FIG. 1 is a perspective view of an example wearable device according to various embodiments.

Referring to FIG. 1, a wearable device 100 may be worn on a part of a user's body (e.g., an ear). The wearable device 100 may include an earbud that transmits an audio signal to the user wearing the wearable device 100. The wearable device 100 may receive audio data related to audio information through a wireless communication with an external electronic device and generate an electrical signal based on the audio data. The wearable device 100 may include an audio output circuit therein. The audio output circuit may convert the electrical signal into an audio signal. The audio signal may be generated from vibration energy generated based on the electrical signal. The audio signal may be transmitted to the outside through an audio duct in the wearable device 100 and may be transmitted to the user wearing the wearable device 100.

According to an embodiment, the wearable device 100 may include a housing 110, a grill 120, and an ear tip 130. The housing 110 may form the appearance of the wearable device 100. The housing 110 may provide a space in which components of the wearable device 100 are disposed. The housing 110 may be formed of a first housing 110*a* and a second housing 110*b*. However, it is not limited thereto and may be formed integrally. The first housing 110*a* may face the first direction d1, and the second housing 110*b* may face the second direction d2. The first housing 110*a* may be a part in contact with the user's body, and the second housing 110*b* may be a part exposed to the outside when wearing the wearable device 100. The first housing 110*a* may include sensors (e.g., a proximity sensor or a touch sensor) configured to contact a part of the user's body or identify approach.

The second housing 110*b* may include a sensor (e.g., a touch sensor) configured to receive a user's input.

According to an embodiment, the grill 120 may be a part of an audio path transmitted to a microphone for obtaining an audio signal related to external noise to remove the external noise. The grill 120 may be a part of a passage (e.g., a ventilation hole) through which external air and air in the user's ears pass while the wearable device 100 is worn. The grill 120 may reduce foreign substances introduced into the wearable device 100 through the path or passage.

According to an embodiment, the ear tip 130 may be a portion in direct contact with the inside of the user's ear (e.g., an ear canal). The ear tip 130 may be formed of an elastic material or a flexible material. The ear tip 130 may be deformed to correspond to the shape of the user's ear canal. The ear tip 130 may be deformed into a shape corresponding to the shape of the inside of the user's ear to fix the wearable device 100 to the inside of the user's body. The ear tip 130 may reduce leakage of a part of the audio signal transmitted from the wearable device 100 to the user to the outside.

According to an embodiment, the housing 110 may include an audio port 111. The audio port 111 may provide an audio path that transmits an audio signal from the audio output circuit to the ear tip 130. The audio port 111 may extend from the first housing 110*a* in a first direction d1. For example, the audio port 111 may protrude from the outer surface of the first housing 110*a* in the first direction d1. The first direction d1 may be a direction facing the inside of the user's ear when the user wears the wearable device 100. The ear tip 130 may be fastened to a part of the audio port 111 and fixed to the housing 110.

According to the above-described embodiment, the wearable device 100 may clearly transmit the audio signal transmitted from the audio port 111 to the user, based on an ear tip deformable to a shape corresponding to the inside of the user's ear.

Figure 2:
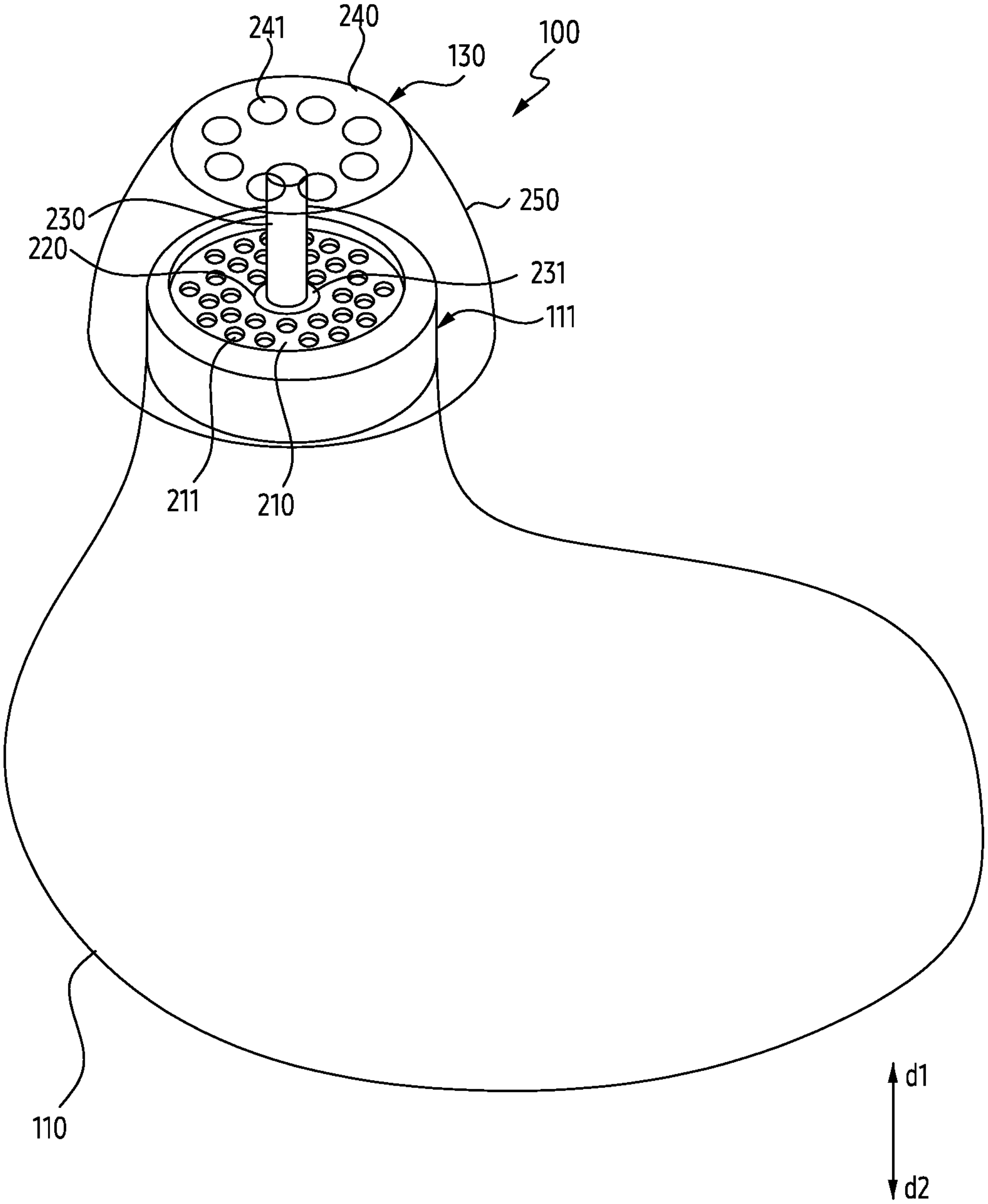
FIG. 2 is a perspective view illustrating an example ear tip according to various embodiments.

FIG. 2 is a perspective view illustrating an example ear tip according to various embodiments.

Referring to FIG. 2, the audio port 111 may include an audio radiation part 210. The audio radiation part 210 may be disposed in an end portion of an acoustic path. The audio radiation part 210 may include audio outlets 211 that transmit an audio signal to the ear tip 130 through the acoustic path. The audio radiation part 210 may include a pit 220 for fastening with the ear tip 130. The pit 220 may be disposed in the audio radiation part 210. For example, the audio radiation part 210 may be formed in a circular shape, and the pit 220 may be disposed in the center of the circular shape. However, it is not limited thereto, and the audio radiation part 210 may have a polygonal shape, and the pit 220 may be disposed at a position substantially the same distance from each side of the polygon.

According to an embodiment, the audio outlets 211 may include a plurality of openings. The audio outlets 211 may penetrate the audio radiation part 210. The audio outlets 211 including the plurality of openings may be spaced apart from a periphery of the pit 220. For example, the plurality of openings may be spaced apart from the pit 220. The plurality of openings may surround the periphery of the pit 220.

According to an embodiment, the pit 220 may accommodate a part of the ear tip 130. For example, the pit 220 may include a fastening structure for fastening with the ear tip 130. The fastening structure will be described in greater detail below with reference to FIG. 3.

According to an embodiment, the ear tip 130 may include an extension part 230, a fastening part 231, a radiation surface 240 and a wing 250. The extension part 230 may extend from the fastening part 231 to the radiation surface 240 in the first direction d1. The extension part 230 may separate the radiation surface 240 from the discharge port 211. For example, the radiation surface 240 may be spaced apart from the radiation surface 240 at a distance corresponding to a length of the extension part 230. The fastening part 231 disposed at one end of the extension part 230 facing the second direction d2 may be inserted into the pit 220. Based on the fastening part 231 inserted in the pit 220, the extension part 230 may be fastened to the audio port 111. For example, the extension part 230 may be disposed between the radiation surface 240 and the audio radiation part 210. The extension part 230 may be fixed to the audio radiation part 210 to support the radiation surface 240. The extension part 230 may include the fastening part 231 for being fastened to the audio radiation part 210. The extension part 230 may include a flexible material. The extension part 230 may be configured to be deformed while being inserted into the user's ear canal. For example, the extension part 230 may be configured to change an angle between the extension part and a direction perpendicular to the audio radiation part 210. For example, the extension part 230 including the flexible material may be configured to change an angle between the first direction d1 (e.g., the first direction d1 of FIG. 1) and the extension part 230. In a state in which the extension part 230 is inserted into the user's ear canal, the angle between the direction perpendicular to the audio radiation part 210 and the extension part may change based on the shape of the user's ear canal.

According to an embodiment, the radiation surface 240 may transmit an audio signal to be transmitted from the audio outlets 211 to the user. For example, the radiation surface 240 may transmit the audio signal to the ear canal of the user wearing a wearable device (e.g., the wearable device 100 in FIG. 1). The radiation surface 240 may include a plurality of openings 241 through which an audio signal passes. The plurality of openings 241 may penetrate the radiation surface 240. The radiation surface 240 may be in contact with the extension part 230. The extension part 230 may be disposed at the center of the radiation surface 240. For example, the radiation surface 240 may be formed in a circular or polygonal shape. When the radiation surface 240 is formed in a circle, the extension part 230 may be disposed at the center of the circle. When the radiation surface 240 is formed in a polygon, the extension part 230 may be disposed at substantially the same distance from each corner of the polygon. The plurality of openings 241 may surround the center of the extension part or the radiation surface 240. For example, the plurality of openings 241 may be spaced apart from the extension part 230. The plurality of openings 241 may surround a contact part between the extension part 230 and the radiation surface 240. According to an embodiment, when viewing the radiation surface 240 from above, the radiation surface 240 may overlap the audio radiation part 210. According to an embodiment, when viewing the radiation surface 240 from above, the radiation surface 240 may be substantially concentric to the audio radiation part 210.

According to an embodiment, the wing 250 may extend from the periphery of the radiation surface 240 toward the audio port 111. The ear tip 130 may surround the audio port 111. For example, the wing 250 may extend toward the audio port 111 and surround the audio port 111. An audio signal emitted from the audio port 111 may be transmitted to the radiation surface 240 through a space formed by the wing 250. The wing 250 may include a flexible material. The wing 250 may be deformed according to the shape of the ear canal within the user's ear canal. While the wearable device 100 is inserted into the user's ear canal, the outer surface of the wing 250 may contact the ear canal. A thickness of the wing 250 deformable according to the shape of the user's ear canal may be thinner than a thickness of the radiation surface 240.

According to the above-described embodiment, the wearable device 100 may be stably worn through the ear tip 130 deformable according to the shape of the user's ear canal. The ear tip 130 deformed into a shape corresponding to the user's ear canal may provide the user with comfort when worn for a long time. The ear tip 130 may be formed of a flexible material, thereby reducing pressure on the user's ears and reducing discomfort caused by wearing. Since the ear tip 130 includes the extension part 230 of the flexible material, it may be bent according to the shape of the ear canal extending inside the user's ear. According to an embodiment, since the ear tip 130 is deformable according to the ear canal of various shapes, the difference in fit that each user feels when wearing may be reduced.

Figure 3:
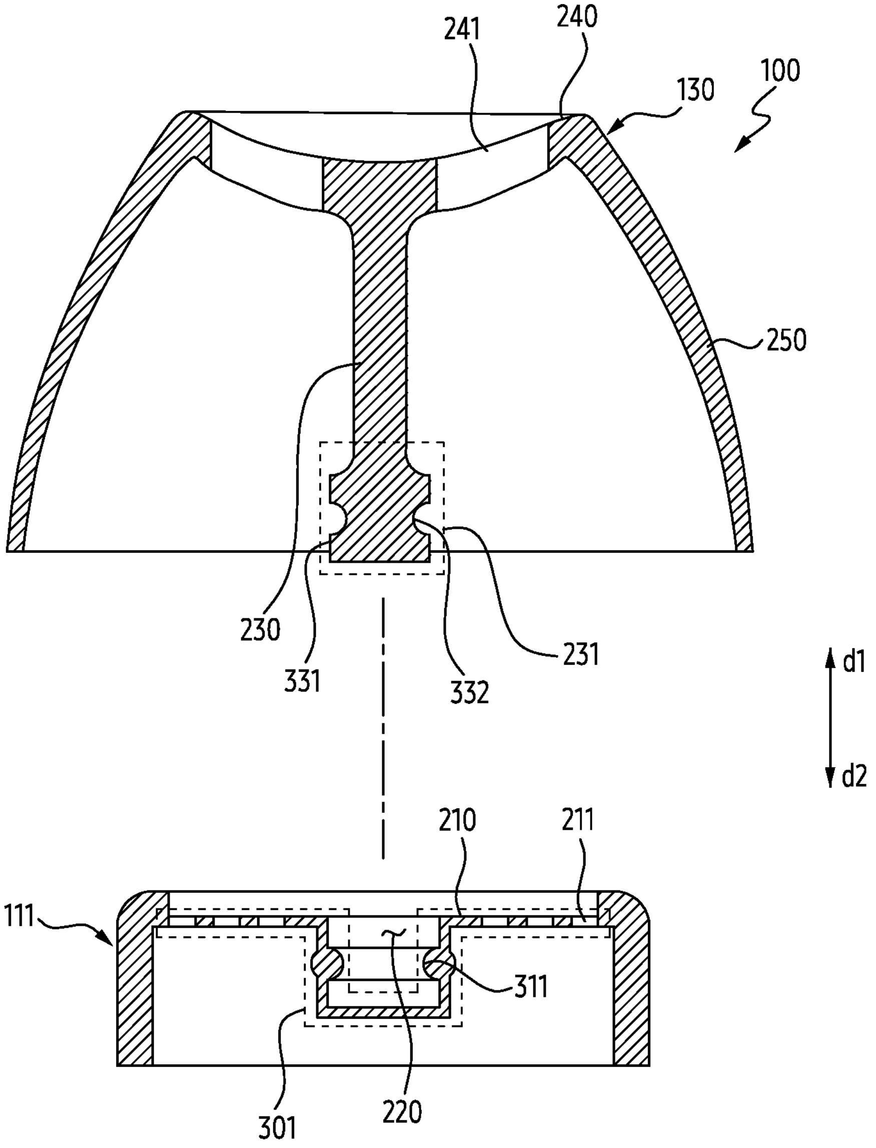
FIG. 3 is a cross-sectional view of a separated example ear tip and an audio port according to various embodiments.
Figure 4:
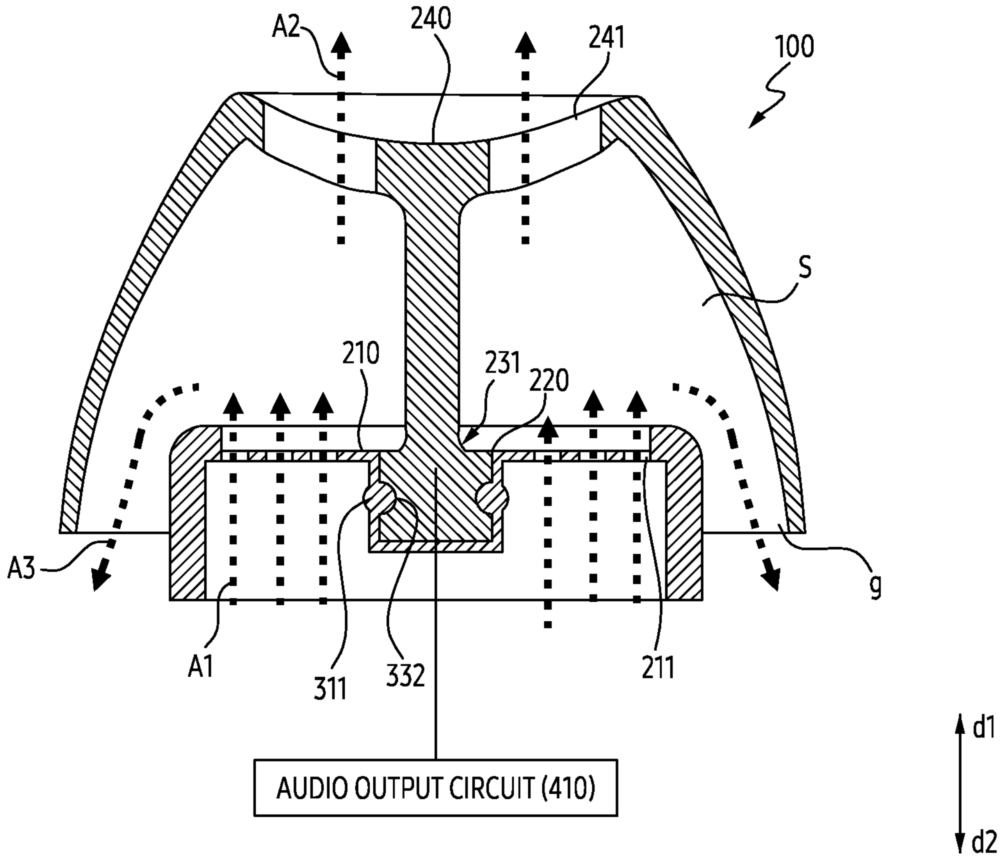
FIG. 4 is a cross-sectional view of a coupled example ear tip and an audio port according to various embodiments.

FIG. 3 is a cross-sectional view of a separated example ear tip and an audio port according to various embodiments. FIG. 4 is a cross-sectional view of a coupled example ear tip and an audio port according to various embodiments.

Referring to FIGS. 3 and 4, the audio port 111 may include the audio radiation part 210. The audio radiation part 210 may include audio outlets 211 for transmitting an audio signal transmitted to the audio radiation part 210. The audio radiation part 210 may include the pit 220. The pit 220 may be disposed at the center of the audio radiation part 210. For example, the audio radiation part 210 may be formed in a circular shape, and the pit 220 may be disposed at the center of the circular circle. The pit 220 may include a ring-shaped protrusion 311 protruded toward the inside of the pit 220. For example, the ring-shaped protrusion 311 may protrude from an inner surface of the pit 220. The ring-shaped protrusion 311 may be integrally formed with the pit 220 formed in the audio radiation part 210. However, it is not limited thereto, and the ring-shaped protrusion 311 may be formed as a separate member from the pit 220 and may be disposed to protrude from the inner surface of the pit 220. The ring-shaped protrusion 311 may fix the fastening part 231 when the fastening part 231 is inserted into the pit 220. For example, the fastening part 231 may be formed to be detachable from the pit 220. The fastening part 231 may include a groove 332 corresponding to the ring-shaped protrusion 311. While the fastening part 231 is inserted into the pit 220, the ring-shaped protrusion 311 may be seated in the groove 332 of the fastening part 231.

According to an embodiment, the audio radiation part 210 may include a metal plate 301 disposed along a surface where the audio outlets 211 are formed and a surface of the pit 220. For example, the metal plate 301 of the audio radiation part 210 may be disposed along the outer surface of the audio radiation part 210. The metal plate 301 may be disposed on the inner surface of the pit 220 and a surface of the end portion of the audio port 111. For example, the metal plate 301 may be disposed along the outer surface of the audio radiation part 210 facing the ear tip 130. The metal plate 301 may be additionally disposed on the inner surface of the audio radiation part 210 facing the outer surface of the audio radiation part 210.

According to an embodiment, when the fastening part 231 is inserted into the pit 220, the metal plate 301 disposed on the outer surface of the audio radiation part 210 facing the ear tip 130 may be in contact with an outer surface 331 of the fastening part 231. The outer surface 331 and the groove 332 of the fastening part 231 may correspond to the shape of the pit 220. For example, the outer surface 331 of the fastening part 231 may have a shape of a surface corresponding to the outer surface of the pit 220, and the groove 332 of the fastening part 231 may have a shape corresponding to the ring-shaped protrusion 311 disposed in the pit 220. For example, the groove 332 may be a pit formed along the circumference of the outer surface 331. While the fastening part 231 of the ear tip 130 is inserted into the pit 220 and fixed, the ring-shaped protrusion 311 may be seated in the groove 332 and engaged. The protrusion 311 engaged with the groove 332 may fix the ear tip 130 to the audio port 111.

According to an embodiment, the ear tip 130 may include the fastening part 231, the radiation surface 240, and the wing 250. The fastening part 231 may include the groove 332 to be coupled to the audio port 111 of the wearable device 100. The extension part 230 may extend from the fastening part 231 in the first direction. The radiation surface 240 may include openings 241 that transmit the audio signal to the ear canal of the user wearing the ear tip and are spaced apart from the extension part 230. The wing 250 may extend from a periphery of the radiation surface 240 toward the audio port 111. The thickness of the wing 250 deformable according to the shape of the user's ear canal may be thinner than the thickness of the radiation surface 240. The shape of the wing 250 may be deformed by an external force. The wing 250 may include a material having elasticity that is restored when the external force is removed. For example, the wing 250 may include silicon, foam, or rubber material. The wing 250 may be configured to be more easily deformed as it moves away from the radiation surface 240. For example, the wing 250 may become thinner as it moves away from the radiation surface. A thickness of a part of the wing 250 adjacent to the radiation surface 240 may be thicker than a thickness of a remaining part of the wing 250.

According to an embodiment, the extension part 230 may include the flexible material and may be configured to change the angle between the first direction and the extension part 230. The fastening part 231 may include a low flexible material. The low flexible material may have lower flexibility than the flexible material. The low flexible material may include a material having lower flexibility or higher rigidity than the flexible material, such as a rigid material, a hard material, a brittle material, and an ultra-low flexible material. For example, the rigid material may be hard silicon. However, it is not limited thereto. A part of the extension part 230 may include the low flexible material, and a remaining part may include the flexible material. For example, the flexible material may be soft silicon. The rigid silicon may have higher rigidity than the soft silicon. The rigid silicon may have a lower elasticity than the flexible silicon. For example, a part of the inside of the extension part 230 extending from the fastening part 231 may be formed of the low flexible material. The extension part 230 may include the flexible material surrounding the low flexible material disposed inside the extension part 230. For example, the extension part 230 may include hard silicon and soft silicon surrounding the hard silicon. The extension part 230 may provide bending of the extension part 230 while reducing damage to the extension part 230 by including the low flexible material and the flexible material. For example, the low flexible material of the extension part 230 may be disposed inside the extension part 230 and referred to a core of the extension part 230 in terms of reinforcing rigidity. The extension part 230 including soft silicon and hard silicon may be formed through a double injection process. For example, in the double injection process, the extension part 230 may be manufactured to form the core of the extension part 230 with the hard silicon and to surround the hard silicon with the soft silicon.

According to an embodiment, the ear tip 130 may provide a path transmitted from the audio port 111 to the outside of the ear tip 130, by fastening to the audio port 111. The ear tip 130 may be configured to provide a space S between the audio port 111 to transmit the audio signal. For example, while the ear tip 130 and the audio port 111 are fastened, the radiation surface 240 and the audio port 111 of the ear tip 130 may be spaced apart from each other. The space S may be surrounded by the radiation surface 240, the audio port 111, and the wing 250.

According to an embodiment, an audio signal A1 transmitted from the audio output circuit 410 may be transmitted to the radiation surface 240 through the space S. The audio output circuit 410 may be disposed in the wearable device 100. The audio output circuit 410 may generate an audio signal and transmit the audio signal to the space S through the audio outlets 211 of the audio port 111. The audio signal A1 may be an audio signal provided through vibration energy converted from an electrical signal through the audio output circuit 410. Some audio signal A2 of the audio signal A1 may be transmitted to the radiation surface 240 through the space S. Some audio signal A2 transmitted to the radiation surface 240 may be transmitted to the outside (e.g., the user's ear or ear canal) through the plurality of openings 241. Some other audio signal A3 of the audio signal A1 may be transmitted through a path other than the plurality of openings 241. For example, some other audio signal A3 may be transmitted to the outside through a gap g connected to the space S. The gap g may be a spaced interval between the wing 250 and the audio port 111. The gap g may be connected to the space S. The gap g may circulate air with the outside from the space S connected to the inside of ear or the ear canal of the user through multiple openings 241. For example, the gap g may maintain the pressure of the ear canal or the inside of the ear and the outside substantially equal. The gap g may reduce the occurrence of inflammation inside the ear when the ear tip 130 is worn for a long time, by flowing the air inside the ear or the ear canal to the outside.

According to the above-described embodiment, the wearable device 100 may transmit the audio signal to the user through the ear tip 130 coupled to the audio port 111. Since the wearable device 100 may be deformed to correspond to the shape of the ear canal through the extension part 230, it may provide a comfortable fit to the user. The wearable device 100 may reduce inflammation of the inside of the user's ear or the ear canal through the gap g connected to the space S.

Figure 5A:
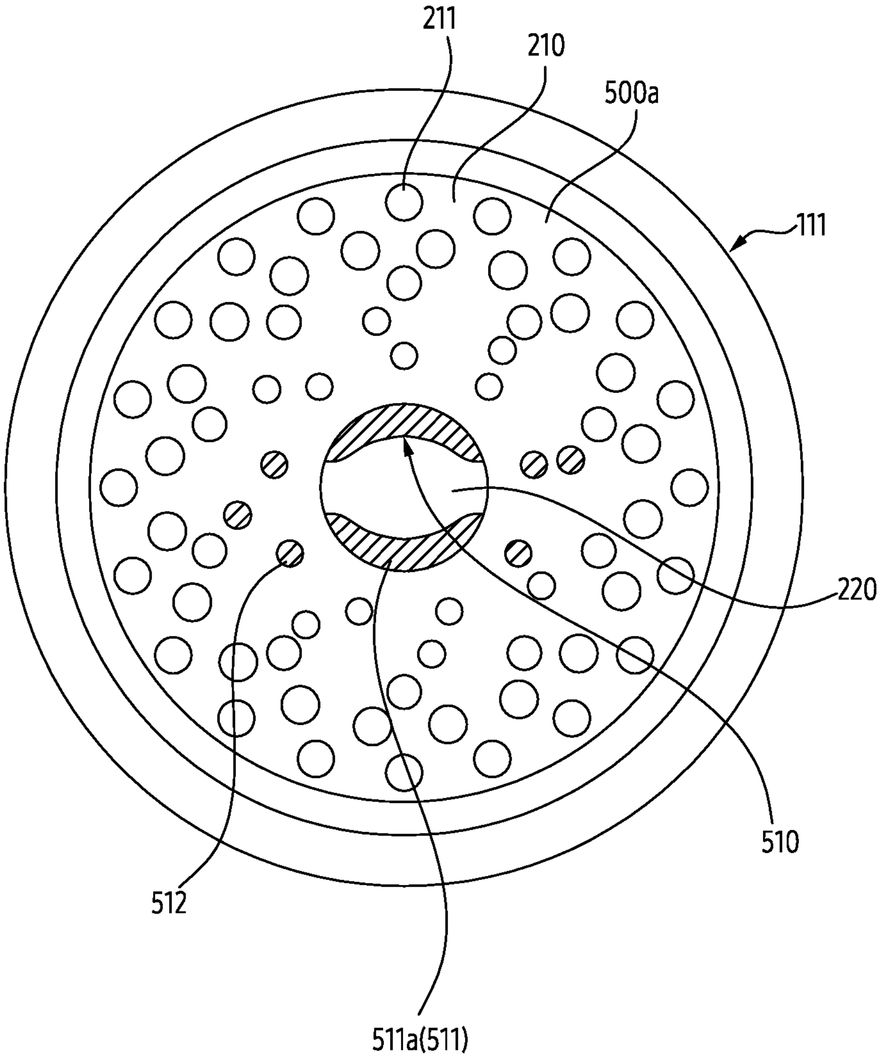
FIG. 5A is a diagram illustrating an example audio port according to various embodiments.
Figure 5B:
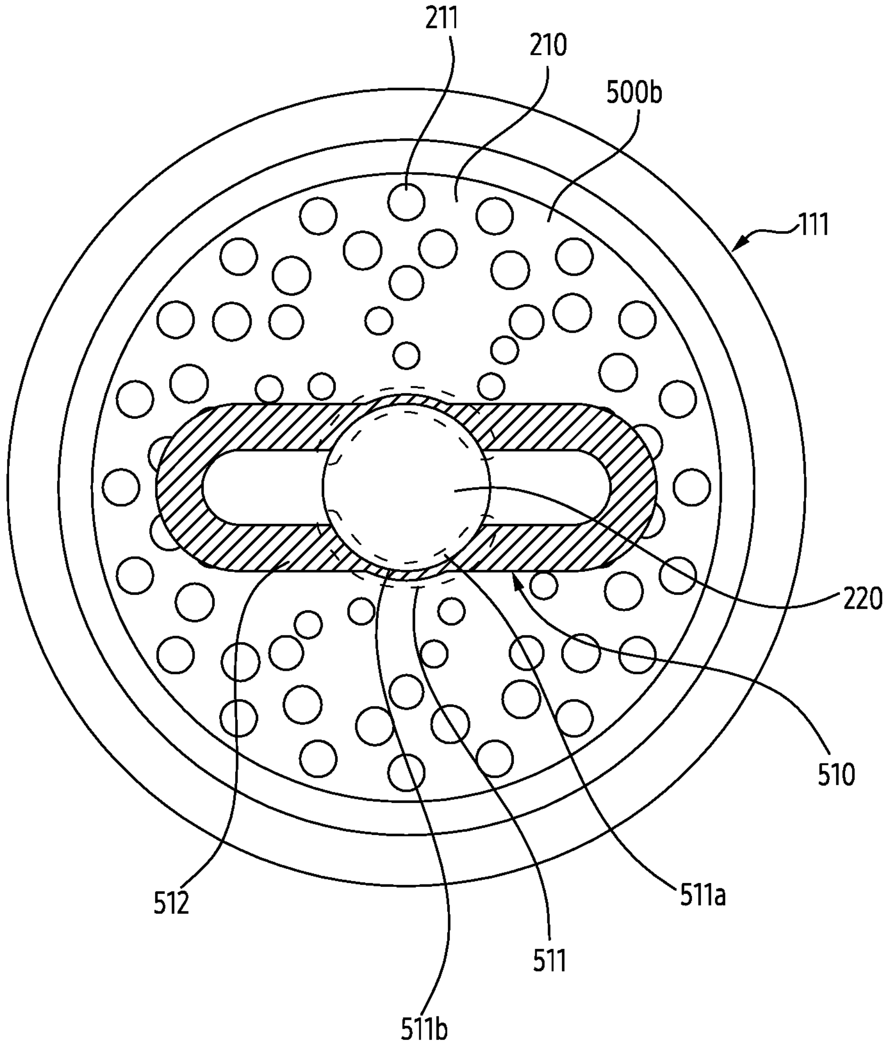
FIG. 5B is a diagram illustrating a rear view of an example audio port according to various embodiments.

FIG. 5A is a diagram illustrating an example audio port according to various embodiments. FIG. 5B is a diagram illustrating a rear view of an example audio port according to various embodiments.

Referring to FIGS. 5A and 5B, the audio port 111 may include an elastic member 510 disposed in the pit 220. The elastic member 510 may include at least one elastic protrusion 511 that may be inserted into the groove 332 of the fastening part 231. For example, the elastic protrusion 511 may protrude from at least one portion of the elastic member 510 toward the groove 232. For example, the elastic protrusion 511 may include a plurality of elastic protrusions facing each other. The elastic member 510 may include a supporting part 512 that fixes the elastic member 510 to the audio port 111 and supports the elastic member 510 fixed to the audio port 111. The fastening part 231 may be detachable from the pit 220 and may include the groove 332 corresponding to the elastic member 510. The elastic member 510 may be extended in a radial direction of the pit 220 while the fastening part 231 is inserted into the pit 220. The elastic member 510 may be deformed to correspond to the groove 332 corresponding to the elastic member 510 in a state that the fastening part 231 and the pit 220 are coupled.

According to an embodiment, when viewing one surface 500*a* of the audio radiation part 210, a part of the elastic member 510 may be exposed by the pit 220 or exposed through the audio outlets 211. A remaining part of the elastic member 510 may be covered by the audio radiation part 210 when viewing the one surface 500*a* of the audio radiation part 210. The part of the elastic member 510 exposed by the pit 220 may be the elastic protrusion 511. The elastic protrusion 511 may protrude to the inner surface of the pit 220 formed on one surface 500*a* of the audio radiation part 210. The elastic protrusion 511 may protrude into the inner surface of the pit 220 to form the protrusion 311 of FIG. 3 or 4. However, it is not limited thereto, and the audio port 111 may include the protrusion 311 integrally formed in the pit 220.

According to an embodiment, the elastic protrusion 511 may be pressed in the radial direction of the pit 220 by the outer surface 331 of the fastening part 231, while the fastening part 231 is inserted into the pit 220. When the fastening part 231 is fully inserted into the pit 220, the elastic protrusion 511 may be deformed into a shape corresponding to the groove 332 of the fastening part 231. The restored elastic protrusion 511 may be seated in the groove 332 and fix the ear tip 130 to the fastening part 231.

According to an embodiment, the elastic protrusion 511 may protrude into the inside of the pit 220 and may be exposed to the outside of the audio port 111, through a slit (not shown) formed along the inner surface of the pit 220. For example, a part 511*a* of the elastic protrusion 511 may protrude inside the pit 220, and a remaining part 511*b* of the elastic protrusion 511 may be disposed outside the pit 220 and may be in contact with another surface 500*b* opposite to the one surface 500*a* of the audio radiation part 210.

According to an embodiment, the supporting part 512 may be in contact with the other surface 500*b* of the audio radiation part 210. The supporting part 512 may extend from a periphery of the elastic protrusion 511. For example, the supporting part 512 may be integrally formed with the elastic protrusion 511. The supporting part 512 and the elastic protrusion 511 may be formed of an elastic material. For example, the elastic member 510 may include a leaf spring made of a metal material. However, it is not limited thereto, the supporting part 512 may include a metal material, and the elastic protrusion 511 may include an elastic silicon, polymer, rubber, or foam material. The elastic protrusion 511 and the supporting part 512 may be formed in a shape having a closed curve. The elastic protrusion 511 and the supporting part 512 may be deformed by external force. For example, the supporting part 512 may be configured to provide deformation of the elastic protrusion 511 by the external force applied to the elastic protrusion 511. Since the supporting part 512 and the elastic protrusion 511 are formed of a material having elasticity, the supporting part 512 may be pressed toward the pit 220 when the elastic protrusion 511 extends in the radial direction of the pit 220. When both ends of the supporting part 512 are pressed, the elastic protrusion 511 may be deformed, and the elastic protrusion may be inserted into the slit formed in the pit 220.

According to the above-described embodiment, the wearable devices 100 (e.g., the wearable devices 100 in FIG. 2) may provide convenience in fastening the pit 220 and the fastening part 231 or separating the fastening part 231 from the pit 220, by including the elastic member 510.

Figure 6:
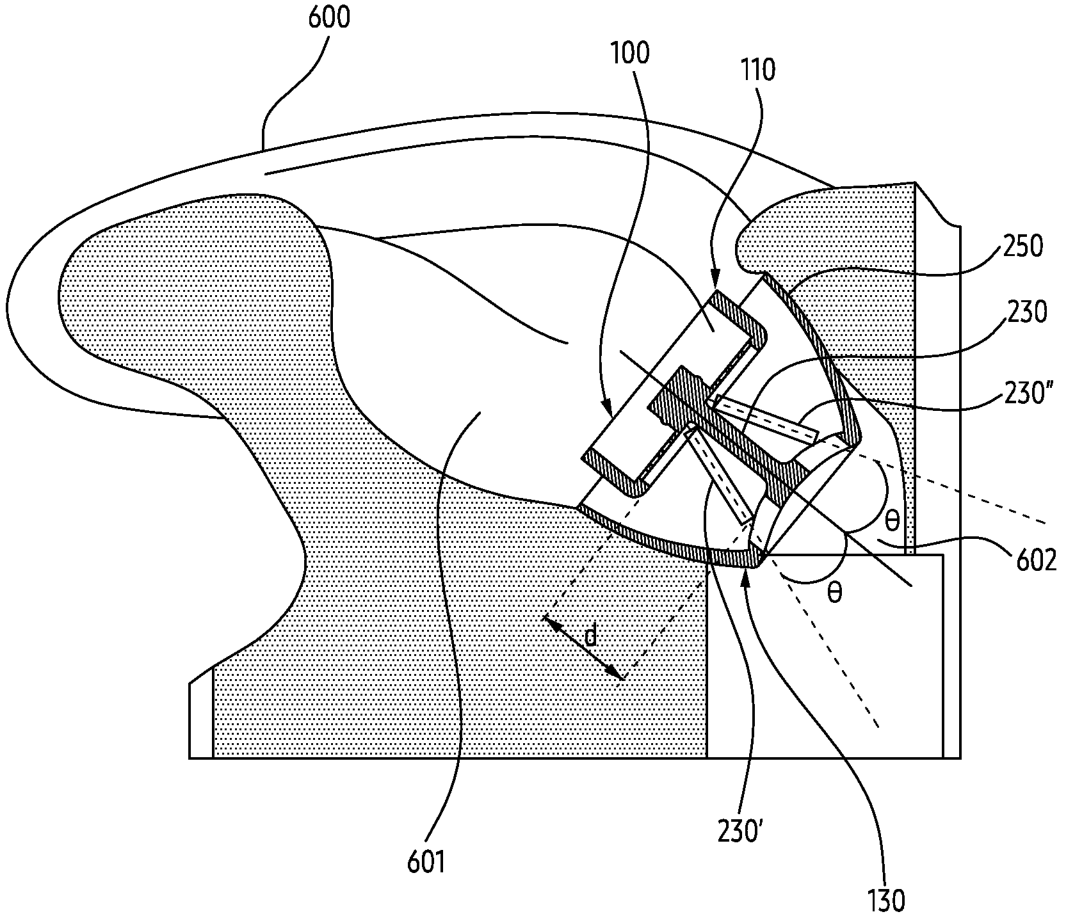
FIG. 6 is a cross-sectional view illustrating an example of wearing an example wearable device according to various embodiments.

FIG. 6 is a cross-sectional view illustrating an example of wearing an example wearable device according to various embodiments.

Referring to FIG. 6, when the wearable device 100 is worn on the ear 600 of the user using the wearable device 100, the wearable device 100 may be deformed according to the internal shape of the ear 600 of the user.

According to an embodiment, the ear tip 130 of the wearable device 100 may be deformed according to a shape of the user's earflap 601 and/or a shape of the ear canal 602, while the user wears the wearable device 100. For example, the wing 250 of the ear tip 130 may be deformed to be in close contact with the inside of the user's ear according to the size or width of the earflap 601. For example, the wing 250 may include a material having flexibility and elasticity. The wing 250 may be formed of the flexible material and deformed to narrow at the boundary between the earflap 601 and the ear canal 602, so it can be closely attached to a part of the earflap 601 and/or a part of the ear canal 602. The ear canal 602 may extend from the earflap 601 toward the eardrum (not shown). The width of the ear canal 602 may be relatively narrower than the earflap 601. The wing 250 of the ear tip 130 closely attached to a part of the earflap 601 and/or a part of the ear canal 602 may prevent and/or reduce leakage (e.g., sound leakage) of an ear canal signal transmitted to the ear canal 602.

According to an embodiment, the extension part 230 of the ear tip 130 may be deformed according to the shape of the ear canal 602. The ear canal 602 may extend from the earflap 601. The ear canal 602 may have different angles extending from the earflap 601 depending on the person.

According to an embodiment, when an angle of the ear canal 602 with respect to the earflap 601 is −Θ degrees, the extension part 230 may be deformed into the first state 230'. For example, the extension part 230 including the flexible material may be deformed to be inclined based on the audio port 111 by an extension angle −Θ of the ear canal 602, when inserted into the entrance of the ear canal 602 through the earflap 601.

According to an embodiment, when the angle of the ear canal 602 with respect to the earflap 601 is Θ degrees, the extension part 230 may be deformed into the first state 230". For example, the extension part 230 including the flexible material may be deformed to be inclined based on the audio port 111 by the extension angle θ of the ear canal 602, when inserted into the entrance of the ear canal 602 through the earflap 601.

According to an embodiment, the extension part 230 may include the flexible material and may have a specified length to provide bending. For example, the extension part 230 may have a length of 4.5 mm to 7 mm from the audio port 111. Since the extension part 230 has a relatively long length, the fastening part 231 and the pit 220 may be disposed away from the radiation surface 240. The extension part 230 having a relatively long length may increase the deformation amount of the ear tip 130. When the extension part 230 is short, the bending angle of the extension part may be small, even though the extension part 230 includes the flexible material. When the extension part 230 is long, it may be difficult for the wing 250 of the ear tip 130 to come into close contact with the ear canal 602 or the earflap 601. The extension part 230 may be configured to change the shape of the extension part 230 based on the shape of the ear canal 602 while closely contacting the wing 250 to a part of the earflap 601 or the ear canal 602.

According to an embodiment, the extension angle of the ear canal 602 may be deformed according to the shape of the ear 600 of the user and the user's posture. For example, when the user's mouth is opened, the ear canal may move in a counterclockwise direction based on the drawing. According to the user's posture or the shape of the user's ear 600, the deviation of the extension angle of the ear canal 602 from the earflap 601 may have a deviation of about 70 degrees. To correspond to the deviation of the extension angle, the extension part 230 may be configured to be deformed at an angle of approximately −35 degrees to approximately 35 degrees in a direction perpendicular to the surface of the audio port 111.

According to the above-described embodiment, the ear tip 130 may provide an extension part 230 deformable according to the shape of the ear canal 602. The ear tip 130 may provide comfort while the user wears the wearable device 100 (e.g., the wearable device 100 of FIG. 2). For example, while the ear tip 130 is inserted into the ear canal 602, the extension part 230 may be deformed to correspond to the angle of the ear canal 602 extending from the earflap 601. The ear tip 130 may reduce the pressure applied to the user's ear, while closely contacting the wing 250 of the ear tip 130 to a part of the user's earflap 601 or a part of the ear canal 602 by the deformed extension part 230.

Figure 7:
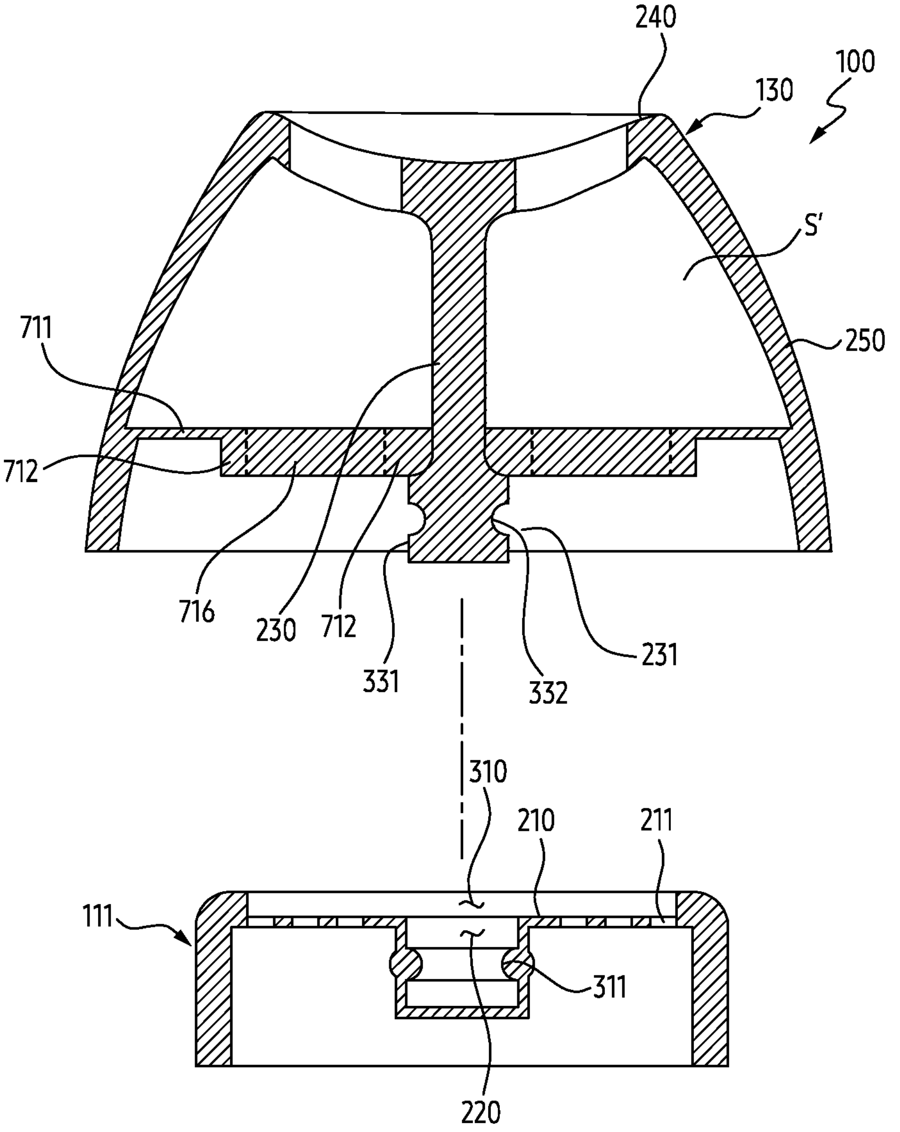
FIG. 7 is a cross-sectional view illustrating an example in which an ear tip and the audio port are cut in a state in which the ear tip including an example separation member and the audio port are separated, according to various embodiments.
Figure 8:
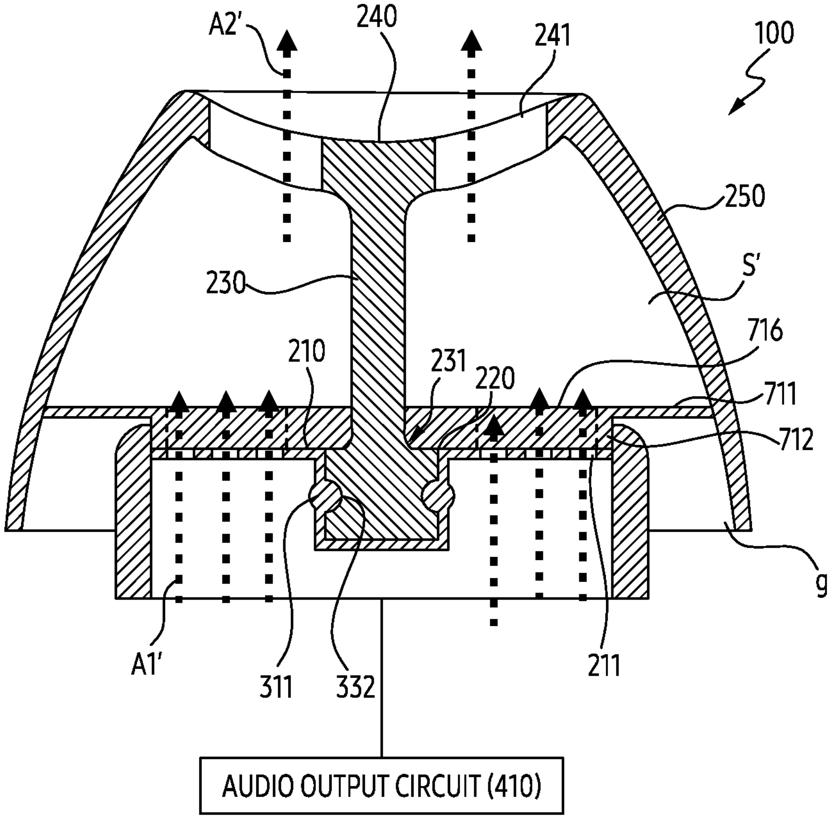
FIG. 8 is a cross-sectional view illustrating an example in which an ear tip and the audio port are cut in a state in which the ear tip including an example separation member and the audio port are coupled, according to an embodiment. various embodiments.

FIG. 7 is a cross-sectional view illustrating an example in which an ear tip and the audio port are cut in a state in which the ear tip including an example separation member and the audio port are separated, according to various embodiments. FIG. 8 is a cross-sectional view illustrating an example in which an ear tip and the audio port are cut in a state in which the ear tip including an example separation member and the audio port are coupled, according to various embodiments.

Referring to FIGS. 7 and 8, the audio port 111 may include the audio radiation part 210. The audio radiation part 210 may include audio outlets 211 for transmitting an audio signal transmitted to the audio radiation part 210. The audio radiation part 210 may include the pit 220. The pit 220 may be disposed at the center of the audio radiation part 210. For example, the audio radiation part 210 may be formed in a circular shape, and the pit 220 may be disposed at the center of the circular circle. The pit 220 may include a ring-shaped protrusion 311 protruded toward the inside of the pit 220. The ring-shaped protrusion 311 may fix the fastening part 231 when the fastening part 231 is inserted into the pit 220. For example, while the fastening part 231 is inserted inside the pit 220, the ring-shaped protrusion 311 may be seated in the groove 332 of the fastening part 231. The ring-shaped protrusion 311 may protrude from the inner surface of the pit 220. The ring-shaped protrusion 311 may be integrally formed with the pit 220 formed in the audio radiation part 210. However, it is not limited thereto, the ring-shaped protrusion 311 may be formed as a separate member from the pit 220 and may be disposed to protrude from the inner surface of the pit 220. For example, the ring-shaped protrusion 311 may include the elastic member 510 of FIGS. 5 and 6. For example, the ring-shaped protrusion 311 including the elastic member 510 may be deformed as the fastening part 231 is inserted into the pit 220. For example, the protrusion 311 may be deformed in the radial direction of the pit 220, as the outer surface 331 of the fastening part 231 presses.

According to an embodiment, the fastening part 231 may be formed to be insertable into the pit 220. For example, the outer surface 331 of the fastening part 231 may have a shape of a surface corresponding to the outer surface of the pit 220. For example, the groove 332 of the fastening part 231 may have a shape corresponding to the ring-shaped protrusion 311 disposed in the pit 220. For example, the groove 332 may be a pit formed along the circumference of the outer surface 331. According to an embodiment, the groove 332 may be one or more pits partially formed on a part of the outer surface 331. While the fastening part 231 of the ear tip 130 is inserted into the pit 220 and fixed, the ring-shaped protrusion 311 may be seated in the groove 332 and engaged. The protrusion 311 engaged with the groove 332 may fix the ear tip 130 to the audio port 111. The fastening part 231 may be inserted into the pit 220, and the ear tip 130 may be fixed to the audio port 111.

According to an embodiment, the audio port 111 may include a guide groove 310 that can accommodate a part of the ear tip 130. For example, a surface on which the pit 220 and the audio outlets 211 are disposed may include the guide groove 310. The guide groove 310 may be recessed from a surface facing the ear tip 130 of the audio port 111. The guide groove 310 may be formed to surround the pit 220. The guide groove 310 may provide a space for seating the protruding area 712 of the separation membrane 711 of the ear tip 130.

According to an embodiment, the ear tip 130 may include the fastening part 231, the radiation surface 240, the wing 250 and the separation membrane 711. The fastening part 231 may include the groove 332 to be coupled to the audio port 111 of the wearable device 100. The extension part 230 may extend from the fastening part 231 in the first direction. The radiation surface 240 may include openings 241 spaced apart from the extension part 230 and transmitting the audio signal to the ear canal of the user wearing the ear tip 130. The wing 250 may extend from the periphery of the radiation surface 240 toward the audio port 111. The extension part 230 may include the flexible material and may be configured to change the angle between the first direction and the extension part 230. The fastening part 231 may include a low flexible material.

According to an embodiment, the separation membrane 711 may be seated on the guide groove 310. The separation membrane 711 may extend from the periphery of the pit 220 to the wing. The separation membrane 711 may divide the inside of the ear tip 130. For example, the separation membrane 711 may be disposed on the inner surface of the wing 250 of the ear tip 130 and may be divided into an area facing the radiation surface 240 and an area facing the audio port 111. The separation membrane 711 may include a connection opening 716. The connection opening 716 may be configured to transmit an audio signal transmitted from the audio outlets. For example, the connection opening 716 may penetrate a part of the separation membrane 711. The connection opening 716 may overlap the audio outlets 211 of the audio port 111. The separation membrane 711 may include a protruding area 712 protruding toward the audio port 111. The protruding area 712 may have a shape corresponding to the guide groove 310. A surface of the protruding area 712 facing the guide groove 310 of the audio port 111 may be in contact with the audio radiation part 210. The connection opening 716 of the separation membrane 711 may be formed in the protruding area 712. The connection opening 716 of the protruding area 712 may be connected to the audio outlets 211 of the audio radiation part 210. The connection opening 716 connected to the audio outlets 211 may transmit an audio signal A1' transmitted from the audio outlets 211 to the space S'.

According to an embodiment, the ear tip 130 may be fastened to the audio port 111 to provide a path transmitted from the audio port 111 to the outside of the ear tip 130. The ear tip 130 may be configured to provide the space S' between the audio port 111 and the radiation surface 240 to transmit an audio signal. The space S' may be surrounded by the separation membrane 711, the wing 250 and the radiation surface 240.

According to an embodiment, the audio signal A1' transmitted from the audio output circuit 410 may be transmitted to the radiation surface 240 through the space S. The audio output circuit 410 may be disposed in the wearable device 100. The audio output circuit 410 may generate the audio signal A1' and transmit the audio signal A1' to the space S through the audio outlets 211 of the audio port 111. The audio signal A1' may be an audio signal provided through vibration energy converted from an electrical signal through the audio output circuit 410. The audio signal A2' transmitted to the radiation surface 240 may be transmitted to the outside (e.g., the user's ear or ear canal) through a plurality of openings 241.

According to an embodiment, the space S' and the gap g of the ear tips 130 of FIGS. 7 and 8 may not be connected. The separation membrane 711 may reduce the occurrence of sound leakage to the outside through the gap g.

According to an embodiment, the separation membrane 711 may be divided into a space S' facing the radiation surface 240 and a space formed by the gap g. Since the space S' and the gap g are separated by the separation membrane 711, the audio signal (e.g., the audio signal A3 of FIG. 4) transmitted through the gap g may be removed. The audio signal A1' transmitted to the space S' may be substantially the same as the audio signal A2' transmitted from the space S' to the outside. The ear tip 130 may reduce sound leakage by separating the space S' from the gap g. The ear tip 130 with reduced sound leakage may transmit an audio signal with reduced audio loss to the user.

According to an embodiment, the wearable device 100 may transmit an audio signal with reduced loss to the user through the ear tip 130 coupled to the audio port 111. Since the wearable device 100 may be deformed to correspond to the shape of the ear canal through the extension part 230, it may provide a comfortable fit to the user. The extension part 230 including the flexible material may provide a comfortable fit for the user, and the fastening part 231 including the low flexible material may provide a stable fastening between the ear tip 130 and the audio port 111.

Figure 9A:
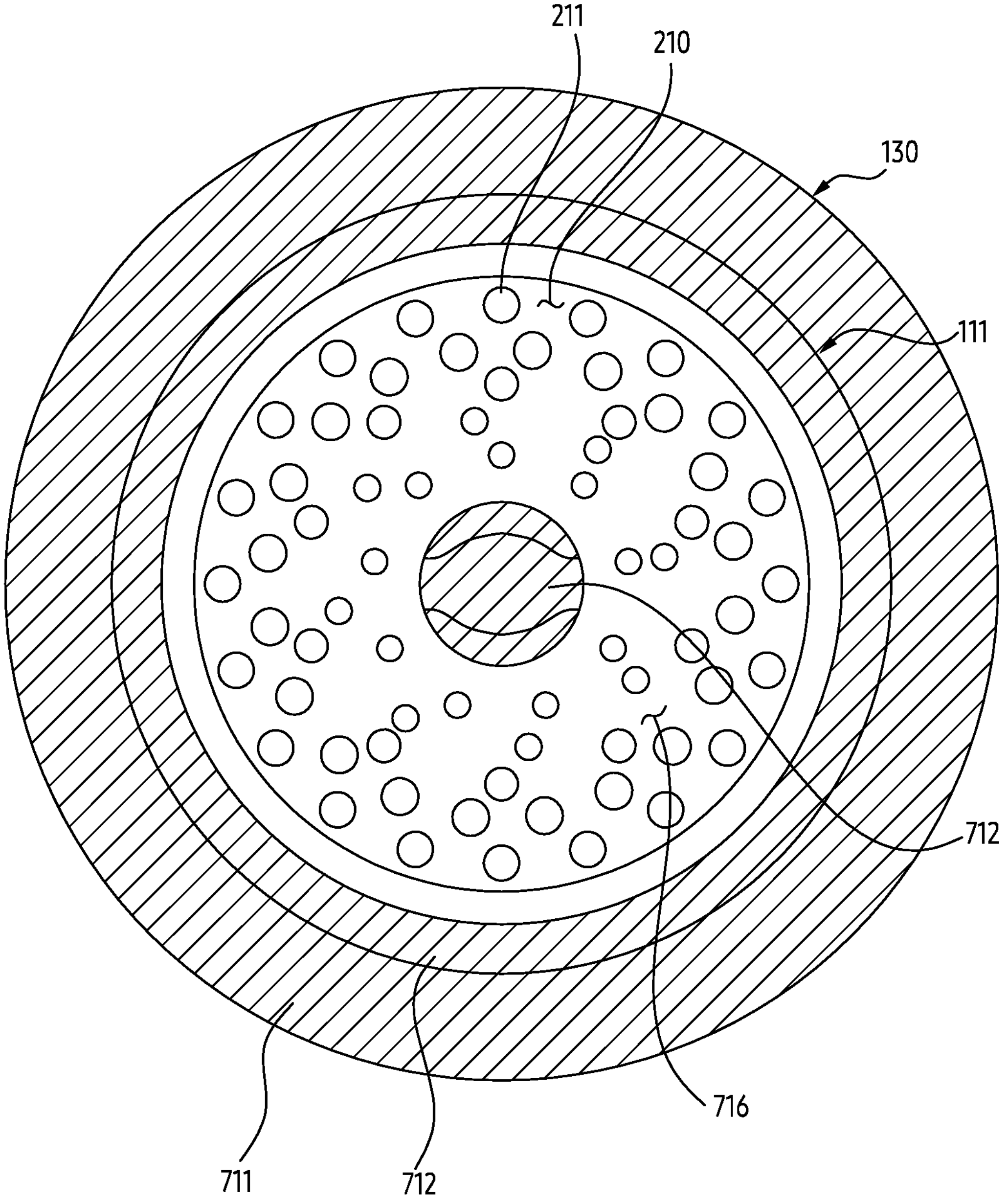
FIGS. 9A and 9B are diagrams illustrating a state in which an example ear tip and an audio port are coupled, according to various embodiments.
Figure 9B:
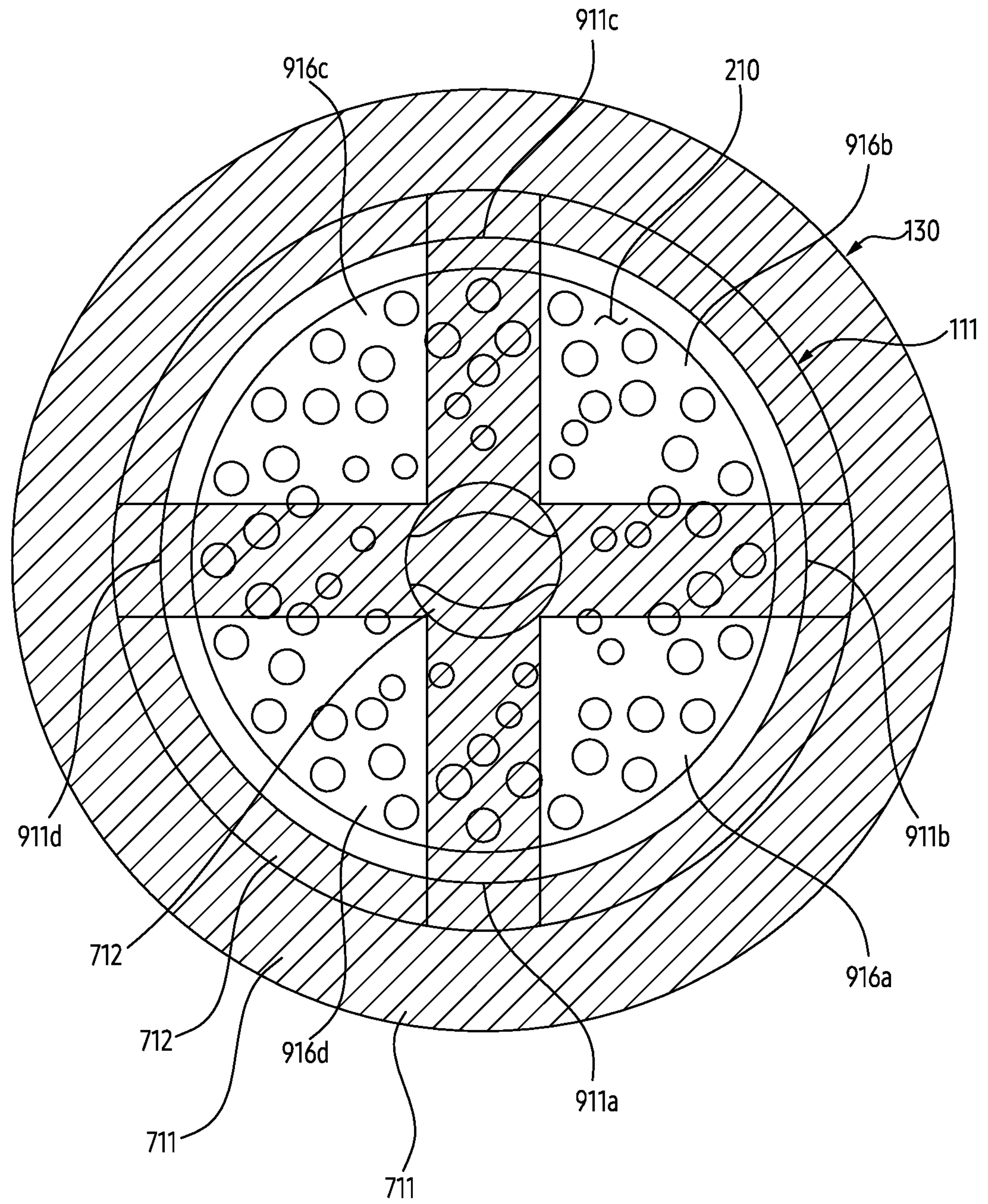

FIGS. 9A and 9B are diagrams illustrating a state in which an example ear tip and an audio port are coupled, according to various embodiments.

Referring to FIG. 9A, the ear tip 130 may include the separation membrane 711. The separation membrane 711 may include an area 712 in contact with the audio port 111. A part of the area 712 may be disposed along the periphery of the audio port 111, a remaining part of the area 712 may be connected to the extension part 230 (e.g., the extension part 230 of FIG. 3) and disposed on the pit 220 (e.g., the fit 220 of FIG. 3). For example, the remaining part of the area 712 may overlap the pit 220.

According to an embodiment, the separation membrane 711 may include a connection opening 716 disposed in the area 712 in contact with the audio port 111. The connection opening 716 may be disposed to overlap the audio outlets 211 formed in the audio radiation part 210, when the separation membrane 711 is viewed from above. For example, the connection opening 716 may be connected to the audio outlets 211. The connection opening 716 connected to the audio outlets 211 may provide an audio path through which an audio signal (e.g., the audio signal A1' of FIG. 8) is transmitted.

According to an embodiment, the connection opening 716 may be formed concentrically with the pit 220. The connection opening 716 may be formed concentrically with components of the ear tip 130. For example, the connection opening 716 may be concentric with the cross-section of the extension part 230, and the connection opening 716 may be concentric with the wing 250 (e.g., the wing 250 in FIG. 3). However, it is not limited thereto. The connection opening 716 may be formed in a donut shape. However, it is not limited thereto, and the connection opening 716 may be formed in a polygon shape. For example, the connection opening 716 may be formed to correspond to the shape of extension part 230, when the extension part 230 is formed in a shape such as a square, hexagon, or octagon shape. The connection opening 716 may be formed to correspond to the shape of the audio port 111, when the shape of the audio port 111 is formed in a polygon such as a square, hexagon, or octagon. In addition to the connection opening 716, the shape of the separation membrane 711 may be formed in various shapes based on the shape of the extension part 230 or the shape of the audio port 111. The separation membrane 711 may be disposed along an inner surface of the wing (e.g., the wing 250 of FIG. 8). According to an embodiment, the separation membrane 711 may be disposed along the inner surface of the wing in a closed curve to separate the space (e.g., the space S' of FIG. 8) and the gap (e.g., the gap g of FIG. 8). According to an embodiment, the separation membrane 711 may be disposed along a part of the inner surface of the wing to connect the space S' and the gap g. As another example, the separation membrane 711 may include a mesh pattern or a grid pattern. By including the mesh pattern or the grid pattern, the space S' and the gap g may be connected.

According to an embodiment, the separation membrane 711 has been described as including the connection opening 716, but a shape of the connection opening 716 is not limited. For example, the separation membrane 711 may surround the audio radiation part 210, and include the mesh pattern or the grid pattern in an area surrounding the audio radiation part 210. The separation membrane 711 may include the mesh pattern or the grid pattern in the entire area.

Referring to FIG. 9B, the separation membrane 711 of the ear tip 130 may include bridges 911*a*, 911*b*, 911*c*, and 911*d* that divide the connection opening 716 into a plurality of connection openings 916*a*, 916*b*, 916*c*, and 916*d*. The bridges 911*a*, 911*b*, 911*c*, and 911*d* may be connected to the extension part (e.g., the extension part 230 of FIG. 7). The bridges 911*a*, 911*b*, 911*c*, and 911*d* may extend from the extension part 230 toward the wing (e.g., the wing 250 of FIG. 7). For example, the bridges 911*a*, 911*b*, 911*c*, and 911*d* may be formed radially based on the extension part 230. The bridges 911*a*, 911*b*, 911*c*, and 911*d* may be in contact with the audio radiation part 210 of the audio port 111. The bridges 911*a*, 911*b*, 911*c*, and 911*d* may be seated in the guide groove (e.g., guide groove 310 of FIG. 7) of the audio port 111. The bridges 911*a*, 911*b*, 911*c*, and 911*d* may form a part of the protruding area (e.g., the protruding area 712 of FIG. 7) of the ear tip 130. The bridges 911*a*, 911*b*, 911*c*, and 911*d* may be seated in the guide groove 310 to provide a stable coupling of the ear tip 130 and the audio port 111.

According to the above-described embodiment, the wearable device 100 (e.g., the wearable device 100 in FIG. 1) may prevent and/or reduce audio signal leakage (e.g., sound leakage) to the outside by having the separation membrane 711. The separation membrane 711 with the connection opening 716 or the connection openings 916*a*, 916*b*, 916*c*, and 916*d* may transmit the audio signal to the space (e.g., the space S' in FIG. 8).

Figure 10:
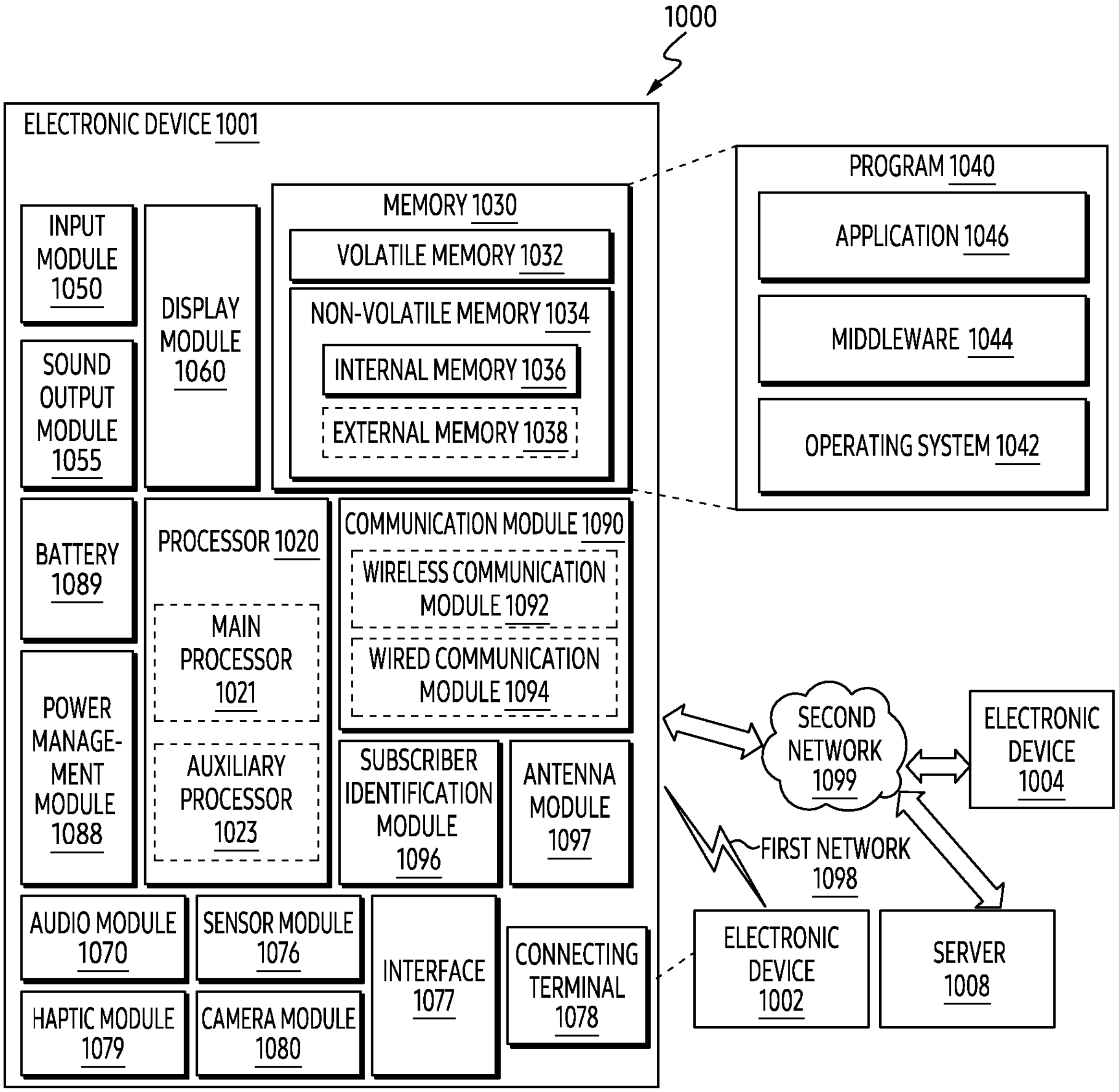
FIG. 10 is a block diagram illustrating an example electronic device in a network environment according to various embodiments.

FIG. 10 is a block diagram illustrating an example electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

According to an example embodiment, a wearable device (e.g., the wearable device 100 of FIG. 1) may comprise: a housing (e.g., the housing 110 of FIG. 1), an audio output circuit (e.g., the audio output circuit 410 of FIG. 4) disposed in the housing, an audio port (e.g., the audio port 111 in FIG. 1) protruding from the housing in a first direction and configured to transmit an audio signal from the audio output circuit and including a pit (e.g., the pit 220 in FIG. 2) disposed on an end portion of the audio port, and an ear tip (e.g., the ear tip 130 of FIG. 1) including a fastening part (e.g., the fastening part 231 of FIG. 3) inserted in the pit, an extension part (e.g., the extension part 230 of FIG. 3) extending from the fastening part in the first direction (e.g., d1), a radiation surface (e.g., the radiation surface 240 of FIG. 3) including openings (e.g., the openings 241 of FIG. 3) configured to transmit the audio signal to an ear canal of a user wearing the wearable device and spaced apart from the extension part (e.g., 230), and a wing (e.g., the wing 250 in FIG. 3) extending from a periphery of the radiation surface to the audio port. The extension part may include a first material. The extension part may be configured to be bent based in the first direction. According to an example embodiment, the fastening part may include a second material having a lower flexibility than a flexibility of the first material.

According to an example embodiment, the wearable device may i a deformable extension part. When the user wears the wearable device, the wearable device may provide a comfortable fit to the user based on the deformation of the extension part corresponding to the internal shape of the user's ear.

According to an example embodiment, the pit may include a ring-shaped protrusion (e.g., the ring-shaped protrusion 311 of FIG. 3) disposed along an inner surface of the pit. The fastening part may be attachable to the pit and separable from the pit. The fastening part may include a groove (e.g., the groove 332 of FIG. 3) configured to accommodate or receive the protrusion.

According to an example embodiment, the wearable device may be configured to attach and detach the ear tip by including the pit configured to couple with the fastening part. When the ear tip is damaged, the user may replace the ear tip by separating the damaged ear tip from the pit and inserting a new ear tip into the pit. When the size of the ear tip is bigger than or smaller than the user's ear, the ear tip may be replaced with a new ear tip.

According to an example embodiment, the audio port may include audio outlets (e.g., the audio outlets 211 in FIG. 2) spaced apart from the pit. The audio outlets may surround a periphery of the pit.

According to an example embodiment, the audio signal may be configured to be transmitted from the audio output circuit through the audio outlets, the audio port and a space surrounded by the wing and the openings.

According to an example embodiment, the wearable device may provide an audio signal transmitted through the audio outlets of the audio port. The wearable device may use the audio outlets, the space, and the openings as an audio path.

According to an example embodiment, the wing may include the same material as the first material. The thickness of the wing may be thinner than a thickness of the radiation surface.

According to an example, when the wearable device is worn by the user, the ear tip may adhere to the inside of the user's ear by thinning the thickness of the wings requiring deformation.

According to an example embodiment, the wing may have an elasticity allowing the wing to be deformed in shape by external force and restored based on the external force being removed (e.g., in the absence of an external force).

According to an example embodiment, the thickness of the wing may become thinner as a distance from the radiation surface increases.

According to an example embodiment, the wearable device may provide easy deformation of the ear tip, when worn by the user by thinning the thickness of the wing requiring deformation.

According to an example embodiment, the audio port may include a metal plate (e.g., the metal plate 301 of FIG. 3) disposed on the inner surface of the pit and a surface of the end portion of the audio port.

According to an example embodiment, the wearable device includes a metal plate, thereby increasing the strength of the pit and the audio radiation part of the audio port. The audio radiation part having increased strength may reduce damage to the audio radiation part due to attachment and detachment of the ear tip.

According to an example embodiment, an elastic member comprising an metal plate disposed on the pit may be included. According to an example embodiment, the fastening part may include a fastening pit detachable to the pit and corresponding to the elastic member.

According to an example embodiment, the elastic member may extend in a radial direction of the pit based on the fastening part of the pit being inserted, and may be configured to be deformed to correspond to the size of the fastening pit corresponding to the elastic member in a state of being coupled to the fastening part.

According to an example embodiment, the wearable device may provide easy attachment and detachment of the ear tip through the elastic member disposed on the pit. The elastic member may be deformed such that the pit of the elastic member is widened in the radial direction of the pit when the ear tip is inserted.

According to an example embodiment, the audio port may include audio outlets spaced apart from the pit and surrounding the pit. A surface on which the pit and the audio outlet are disposed may include a guide groove. The guide groove may be recessed in a direction from the audio port toward the inside of the wearable device.

According to an example embodiment, the ear tip may include: a separation membrane (e.g., the separation membrane 711 of FIG. 7) seated on the guide groove. The separation membrane may extend from the periphery of the guide groove to the wing.

According to an example embodiment, the separation membrane may include a connection opening (e.g., the connection opening 716 in FIG. 7) configured to transmit an audio signal from the audio output circuit.

According to an example embodiment, the connection opening may include a plurality of connection openings (e.g., connection openings 916*a*, 916*b*, 916*c*, and 916*d* in FIG. 9) by bridges (e.g., bridges 911*a*, 911*b*, 911*c*, and 911*d* in FIG. 9) connected to the extension part.

According to an example embodiment, the wearable device may be configured to transmit an audio signal from the audio outlet to the inner space of the ear tip through the connection opening disposed in the separation membrane. The wearable device may reduce leakage of an ear canal signal transmitted to the inner space and transmit the same to the user's ear.

According to an example embodiment, the extension part may further include a core extending from the fastening part including a second material. According to an example embodiment, the core may be disposed in the extension part.

According to an example embodiment, the wearable device may provide bending of the extension part while reducing damage to the extension part, by providing the extension part including the second material and the first material.

According to an example embodiment, the wing may be deformed into a shape corresponding to the user's ear canal while the user wears the wearable device.

According to an example embodiment, the wearable device may be configured to transmit an audio signal through an ear tip coupled to the audio port. The wearable device may be configured to be deformed to correspond to the shape of the ear canal through the extension part, and provide a comfortable fit to the user. The wearable device may reduce inflammation of the inside of the user's ear or the ear canal through a gap connected to the space.

According to an example embodiment, the ear tip (e.g., the ear tip 130 in FIG. 1) may include: a fastening part (e.g., the fastening part 231 in FIG. 3) including a groove configured to be coupled to the audio port of the electronic device. The ear tip may include an extension part (e.g., the extension part 230 in FIG. 3) extending from the fastening part in the first direction. The ear tip may include the radiation surface (e.g., the radiation surface 240 of FIG. 3) including openings (e.g., the openings 241 of FIG. 3) spaced apart from the extension part and configured to transmit an audio signal to the ear canal of a user wearing the ear tip. The ear tip may include a wing (e.g., the wing 250 of FIG. 3) extending from a periphery of the radiation surface toward the audio port.

According to an example embodiment, the extension part may include a first material and may be configured to change an angle between the first direction and the extension part. The fastening part may include a second material.

According to an example embodiment, the wearable device may provide a deformable extension part. When the user wears the wearable device, the wearable device may provide a comfortable fit to the user based on the deformation of the extension part corresponding to the internal shape of the user's ear.

According to an example embodiment, the wing may include the first material. A thickness of the wing may be thinner than a thickness of the radiation surface.

According to an example embodiment, when the wearable device is worn by the user, the ear tip may adhere to the inside of the user's ear, by thinning the thickness of the wing requiring deformation.

According to an example embodiment, the wing may have elasticity allowing the wing to be deformed in shape by external force and restored in the absence of the external force.

According to an example embodiment, a thickness of a part of the wing adjacent to the radiation surface may be thicker than a thickness of a remaining part of the wing.

According to an example embodiment, the wearable device may provide easy deformation of the ear tip when worn by the user, by thinning the thickness of the wing requiring deformation.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device comprising:

a housing;

an audio output circuit disposed in the housing;

an audio port protruding from the housing in a first direction and configured to transmit an audio signal from the audio output circuit, the audio port including a pit disposed on an end portion of the audio port; and an ear tip including:

a fastening part configured to be inserted in the pit, an extension part extending from the fastening part in the first direction, a radiation surface including openings configured to transmit the audio signal to an ear canal of a user wearing the wearable device, the openings being spaced apart from the extension part, and a wing extending from a periphery of the radiation surface to the audio port;

wherein the extension part is configured to change an angle between the first direction and the extension part and includes a first material, and wherein the fastening part includes a second material having a lower flexibility than a flexibility of the first material.

2. The wearable device according to claim 1, wherein the pit includes a ring-shaped protrusion protruding from a surface of the pit, and wherein the fastening part is detachable from the pit and the fastening part includes a groove configured to receive to the protrusion.

3. The wearable device, according to claim 1, wherein the audio port includes audio outlets spaced apart from the pit, and wherein the audio outlets surround a periphery of the pit.

4. The wearable device, according to claim 1, wherein the audio signal is configured to be transmitted from the audio output circuit through the audio outlets, the audio port and a space surrounded by the wing and the openings.

5. The wearable device, according to claim 1, wherein the wing includes the first material, and wherein a thickness of the wing is thinner than a thickness of the radiation surface.

6. The wearable device, according to claim 1, wherein the wing includes an elastic material deformable by an external force and configured to be restored in the absence of the external force.

7. The wearable device, according to claim 1, wherein a thickness of a portion of the wing adjacent to the radiation surface is thicker than a thickness of a remaining portion of the wing.

8. The wearable device, according to claim 1, wherein the audio port includes a metal plate disposed on an inner surface of the pit and a surface of an end portion of the audio port.

9. The wearable device according claim 1, further comprising an elastic member comprising a metal plate having elastic, the elastic member disposed in the pit and wherein the fastening part is detachable from the pit and the fastening part includes a groove configured to receive the elastic member.

10. The wearable device, according to claim 1, wherein the elastic member is configured to expand in a radial direction of the pit based on the fastening part being inserted into the pit and the elastic member is configured to be deformed to correspond to a size of the groove based on the elastic member being coupled with the fastening part.

11. The wearable device, according to claim 1, wherein the audio port includes audio outlets spaced apart from the pit and a guide groove formed on a surface on which the audio outlets are disposed.

12. The wearable device, according to claim 1, wherein the ear tip includes a separation membrane seated in the guide groove, and wherein the separation membrane extends from a periphery of the pit to the wing.

13. The wearable device, according to claim 1, wherein the separation membrane includes a connection opening configured to transmit audio signals from the audio outlet.

14. The wearable device, according to claim 1, wherein the connection opening is divided into a plurality of connection openings by bridges connecting the extension part.

15. The wearable device, according to claim 1, wherein the extension part further includes a core extending from the fastening part having the second material, and wherein the core is disposed in the extension part.

16. The wearable device, according claim 1, wherein based on the wearable device being worn, the wing is deformed into a shape corresponding to an ear canal.

17. An ear tip comprising:

a fastening part including a groove configured to couple to an audio port of an electronic device;

an extension part extending from the fastening part in a first direction;

a radiation surface including openings spaced apart from the extension part and configured to transmit an audio signal to the ear canal of a user wearing the ear tip; and a wing extending from a periphery of the radiation surface toward the audio port; and wherein the extension part is configured to change an angle between a direction perpendicular to the fastening part and the extension part and includes a first material, and wherein the fastening part includes a second material having a lower flexibility than a flexibility of the first material.

18. The ear tip, according to claim 17, wherein the wing includes the first material, and wherein a thickness of the wing is thinner than a thickness of the radiation surface.

19. The ear tip, according to claim 17, wherein the wing comprises an elastic body configured to be deformed in shape by an external force and to be restored based on the external force being removed.

20. The ear tip, according to claim 17, wherein a thickness of a portion of the wing adjacent to the radiation surface is thicker than a thickness of a remaining portion of the wing.

* * * * *